UNITED STATES PATENT OFFICE.

OTTO LAIST, OF CINCINNATI, OHIO.

IMPROVEMENT IN THE MANUFACTURE OF GLYCERINE.

Specification forming part of Letters Patent No. 75,929, dated March 24, 1868.

*To all whom it may concern:*

Be it known that I, OTTO LAIST, of Cincinnati, in the county of Hamilton and State of Ohio, have invented a new and Improved Method of Refining Glycerine; and I do hereby declare that the following is a full, clear, and exact description thereof, which will enable those skilled in the art to make and use the same, reference being had to the accompanying drawings, forming part of this specification.

This invention relates to a new and improved method of refining glycerine, whereby it is rendered inodorous and colorless, and with less time and expense than by methods heretofore used.

The process consists in distilling the crude glycerine in a retort or still in which is placed any suitable fatty body, as animal or vegetable oils, or any oleaginous acids, as margic or stearic acids and the like. I place the crude glycerine, as free from water as possible, in the still, and with a quantity of fatty matters, the proportions of which are one part of fat or oil to four of crude glycerine, though these proportions may be varied considerably without materially affecting the result.

Glycerine being difficult to distill from the fact that it condenses quickly from the volatile state, I employ a jet of superheated steam, which I conduct into the still or retort by any suitable pipe, as *a* in the accompanying drawings.

In practice the temperature of this steam is about 420° Fahrenheit scale, which keeps the contents of the still at the proper vaporized state, whereby the glycerine and a portion of the fatty substance are carried over, in the process of distillation, into the condensers, one of which is shown at A. Each crook of the worm B is provided, in practice, with a condenser, as shown at A, which takes the condensed glycerine as it falls from the steam, when the temperature of the latter is lowered, in passing over the successive crooks of the worm. The pipes *b b b* exhibit the point of attachment of the condensers. The steam, which is less dense, escapes at *d*, bearing with it the fatty acids and other volatile impurities.

The action of the fatty or oleaginous matter used with glycerine is to inclose the minute globules of glycerine, and thereby protect it from the action of the air, which decomposes it, and forms acroleine—an odorous amber-colored product, which constitutes an objectionable impurity.

The methods heretofore practiced in refining glycerine involved the employment of carbonized bones and other substances, and necessitated a separate operation after that of distillation had been performed.

My improved method accomplishes the rectification of glycerine by one simple, inexpensive operation, and produces a superior article to that resulting from the old processes.

I claim as new and desire to secure by Letters Patent—

1. The employment of any oleaginous substances, fat, or fatty acids in the refinement or rectification of glycerine, substantially as and for the purpose set forth.

2. The employment of a jet of superheated steam, introduced into a glycerine retort or still, substantially as and for the purposes set forth.

The above specification of my invention signed by me this 21st day of December, 1867.

OTTO LAIST.

Witnesses:
O. H. HARTMAN,
G. BILLINGS.